(12) United States Patent
Takekawa et al.

(10) Patent No.: US 6,532,006 B1
(45) Date of Patent: Mar. 11, 2003

(54) COORDINATES INPUT DEVICE, COORDINATES INPUT METHOD, A DISPLAY BOARD SYSTEM

(75) Inventors: Kenichi Takekawa, Aichi (JP); Tsutomu Ogasawara, Aichi (JP); Takahiro Ito, Aichi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/487,672

(22) Filed: Jan. 20, 2000

(30) Foreign Application Priority Data

Jan. 29, 1999 (JP) ............................. 11-022381

(51) Int. Cl.$^7$ ............................. G09G 5/00; G09G 5/08
(52) U.S. Cl. ..................... 345/173; 345/175; 345/177; 345/179; 345/166
(58) Field of Search .................. 345/156, 158, 345/166, 173, 175, 177, 179; 178/18.01, 18.03, 19.01, 19.02

(56) References Cited

U.S. PATENT DOCUMENTS 4,507,557 A    3/1985 Tsikos
6,229,529 B1 *  5/2001 Yano et al. ............. 345/175

FOREIGN PATENT DOCUMENTS

EP    0 227 958    7/1987
GB    2 204 126    11/1988
JP    9-91094      4/1997

OTHER PUBLICATIONS

U.S. patent application Ser. No. 09/349,461, filed July 9, 1999, pending.
U.S. patent application Ser. No. 09/487,672, filed Jan. 20, 2000, pending.
U.S. patent application Ser. No. 09/577,496, filed May 25, 2000, pending.
U.S. patent application Ser. No. 09/655,776, filed Sep. 5, 2000, pending.
U.S. patent application Ser. No. 10/000,090, filed Dec. 4, 2001, pending.

* cited by examiner

Primary Examiner—Richard Hjerpe
Assistant Examiner—Duc Dinh
(74) Attorney, Agent, or Firm—Oblon, Spivak, McClelland, Maier & Neustadt, P.C.

(57) ABSTRACT

A coordinates input device comprises, two optical units which emit a light flux onto a panel and also receive the light flux. The coordinates input device then calculates the coordinates of an obstacle in the light flux on the panel based on the result of light flux detection in the optical units and the dimensions of the panel. The coordinates input device further comprises a sound-wave generator and a sound-wave detector for measuring the dimensions, used in the calculation of the coordinates, of the panel.

13 Claims, 13 Drawing Sheets

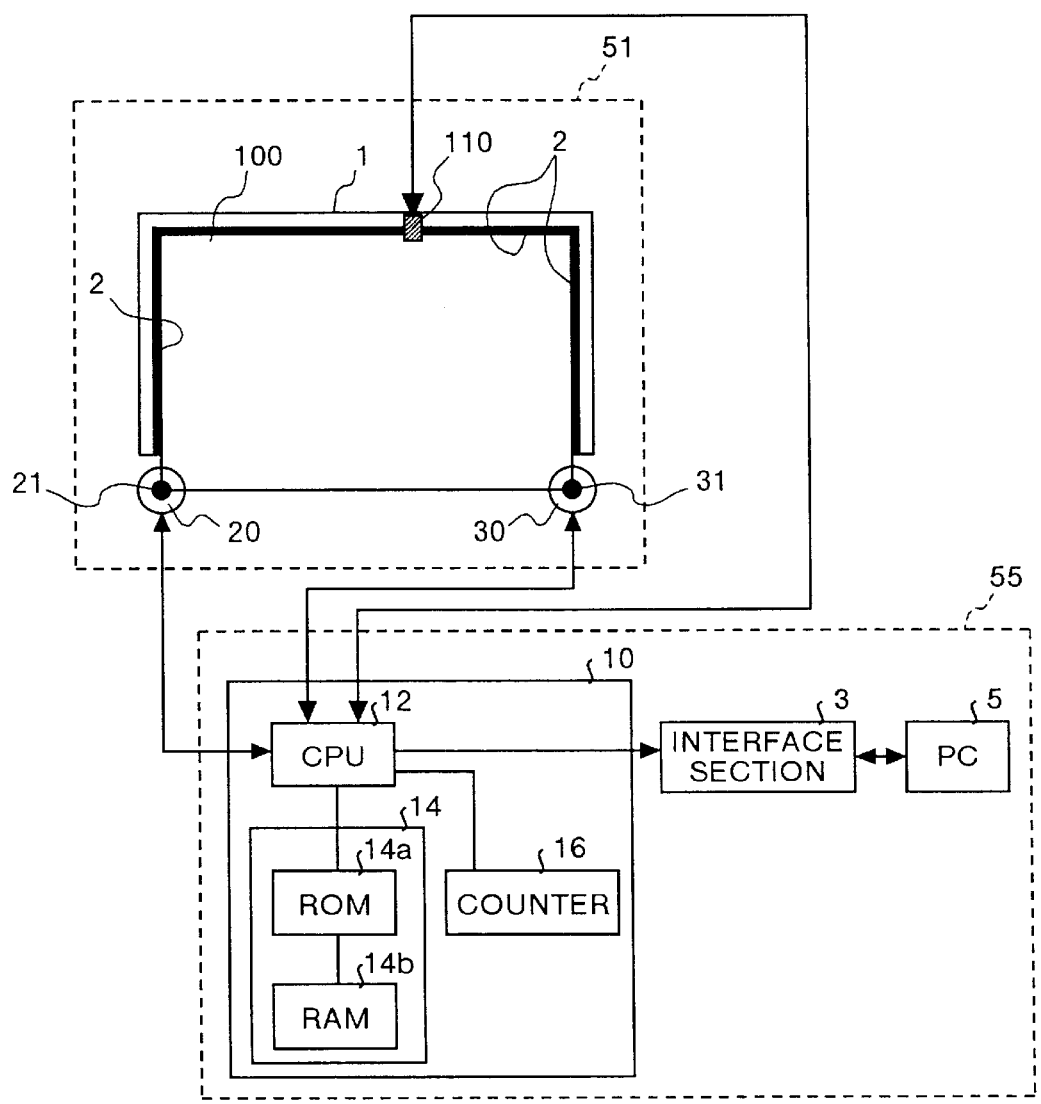

COORDINATES INPUT DEVICE, COORDINATES INPUT METHOD, A DISPLAY BOARD SYSTEM

FIELD OF THE INVENTION

The present invention relates to a coordinates input device, a coordinates input method with which the coordinates of a manually specified point can be input and a display board system which uses such a coordinates input device.

BACKGROUND OF THE INVENTION

Presently there is known a display board system in which a freehand information (e.g. characters, drawings etc.) written on the surface of the board (hereafter called as writing surface), which surface defines an entry area, can be input into a computer or so in real time. Such a display board system uses a coordinates input device which detects the coordinates of the position of the pen where the pen touches the writing surface and successively inputs these coordinates into a computer or the like.

In one of the methods of detecting coordinates by the coordinates input device, light is made use of. For instance, light is irradiated on the entire surface of the writing surface and the reflected light is detected. When something is written on the writing surface, the pen hinders the light and the coordinates of the position of the pen can be obtained from the detected reflected light. Such a method is disclosed in Japanese Patent Laid-Open Publication No. HEI 9-91094. In the Japanese Patent Laid-Open Publication No. HEI 9-91094 there is disclosed a configuration in which a light source is driven using a driving unit in such a manner that the light is irradiated on the entire surface of the writing surface (which may be a touch panel) and the writing surface can be scanned with the light.

There is a further simplified configuration obtained by removing a driving unit from the device described above. In this configuration, light emitted from a light source is spread in a fan shape using a lens or the like so as to cover an entire area of the writing surface. FIG. 13 explains the principles of this method in a simple manner. The configuration shown in the figure comprises a panel 100 as a writing surface, a reflector 2 provided on the three sides of the panel 100, and a light source R provided at the lower-right corner and a light source L provided at the lower-left corner of the panel 100. Point $P(x_p, y_p)$ on the panel 100 indicates a position of a pen tip on the panel 100.

The light emitted from any of the light sources R and L is spread by a lens (not shown) placed on the front surface of each of the light sources R and L and becomes a light flux in a fan shape (hereafter called as fan-shaped light flux) having a central angle of 90 degrees. This fan-shaped light flux is reflected by the reflector 2 provided at the edge of the panel 100. This reflector 2 is designed in such a way that a fan-shaped light flux is reflected along an optical axis which is identical to the one along which the light came in. Therefore, the fan-shaped light flux in reflected back towards the light sources R and L along an optical axis which is identical to the one along which the light came in. This reflected light is directed towards a not shown light receiver, for instance, using a not shown mirror provided on this optical axis and the light is detected.

When the tip of the pen tip is placed on the position of point P on the panel 100, a light beam passing through the point P of the fan-shaped light flux is reflected by the pen tip and it does not reach the reflector 2 (in the specification, this situation will be described as "the light beam is blocked by the pen tip") Therefore, only the reflected light of the light beam passing through the point P of the fan-shaped light flux can not resultantly be detected by the light receiver. By using, for example, a CCD line sensor as the light receiver, optical axis of the light beam which is not received can be identified from the whole reflected light beams.

Since the optical axis of the reflected light is identical to that of the emitted light and the point P exists on the optical axis of a light beam which is not detected, a angle of emission of the light beam passing through the point P can be calculated from the optical axis of the reflected light which is not detected. Therefore, angle of emissions $\theta_L$ and $\theta_R$ can be calculated from the results of reception of light by the two light receivers, and optical axes $a_L$ and $a_R$ can be calculated from those angle of emissions. Further, coordinates $(x_p, y_p)$ of the point P, which is an intersection point of the optical axes $a_L$ and $a_R$ can also be calculated.

More specifically, the coordinates $(x_p, y_p)$ of the point P can be calculated as described below. Namely, $$x_p = (\tan\theta_R \cdot W)/(\tan\theta_R + \tan\theta_L) \quad (1)$$

$$y_p = (\tan\theta_R \cdot \tan\theta_L \cdot W)/(\tan\theta_R + \tan\theta_L) \quad (2)$$
$$= x_p \cdot \tan\theta_L$$

Where W is a distance between centers of the light sources R and L.

Thus, the coordinates input device reads a locus of a pen tip by successively reading coordinates of the pen tip moving along the panel 100 and can automatically record contents written in the panel 100.

The distance W between centers of the light sources R and L is used in equations (1) and (2) for calculating coordinates $(x_p, y_p)$. However, the distance W may slightly vary depending upon the accuracy with which the light sources R and L are attached to the panel 100. Further, the distance W may slightly vary depending upon the accuracy with which the dimensions of the panel 100 have been maintained during manufacture. If the distance W varies, the variation is also reflected into the results of the equations (1) and (2). Therefore, there is a great probability that coordinates $(x_p, y_p)$ can not accurately be calculated.

In addition, the material used to manufacture the panel 100 can easily be machined and is low cost, however, it can easy get deformed (expand or shrink) depending upon the surrounding temperature. Therefore, there is great possibility that the coordinates $(x_p, y_p)$ may change depending on the surrounding temperature.

In order to solve the above-described problems, i.e. to keep the value of W to be as a designed value at any time, it is required to improve accuracy of attachment of the light sources R and L to the panel 100. Further, improve the accuracy in maintaining the dimensions of the panel 100, and to manufacture the panel 100 with a material which does not deform much depending upon the temperature. However, most of the technologies that improve accuracy of attachment and accuracy of dimensions requires sense and experience of a skilled engineer, therefore it has been thought that the technology is generally inappropriate to be applied to products to be mass-produced. Regarding manufacturing the panel 100 with a material which does not deform much depending upon the temperature, if such material is used then the easiness of machining may be damaged or the cost of manufacturing may be increased.

SUMMARY OF THE INVENTION

The present invention has been made for solving the problems described above, and it is a first object of the present invention to provide a coordinates input device and a display board system enabling an accurate detection of an obstacle.

In addition, it is a second object of the present invention to provide a coordinates input device and a display board system enabling accurate detection of the obstacle any time no matter how much the material used for manufacturing the entry area gets deformed.

The problems described above can be solved by the means described below.

The coordinates input device according to one aspect comprises a light emitter which emits a light flux to a specified entry area; a light receiver which receives the light flux emitted from the light emitter; a coordinate calculator for calculating coordinates of an obstacle in the light flux on the entry area based on the light flux received by the light receiver and the dimensions of the entry area; and an entry-area measurement unit for measuring the dimensions of the entry area used for calculating the coordinates by the coordinate calculator. The coordinates input device obtains dimensions of an entry area of the coordinates input device at any time by measuring and calculating dimensions of the entry area required for calculating coordinates. Thus, accurate dimensions of the entry area can be obtained without improving accuracy of attaching the optical units thereto or accuracy of dimensions of an entry area.

A display board system according to another aspect of this invention comprising a display unit for displaying characters and images thereon and the coordinates input device according to the above invention to be provided on the front surface of the display unit. Because the coordinates input device has a configuration as described above, accurate dimensions of the entry area can be obtained without improving accuracy of attaching the optical units thereto or accuracy of dimensions of an entry area.

Other objects and features of this invention will become apparent from the following description with reference to the accompanying drawings.

BRIEF DESCRIPTION OF THE DRAWINGS

FIG. 7 is a block diagram for explaining the coordinates input device according to Embodiment 3 of the present invention.

DESCRIPTION OF THE PREFERRED EMBODIMENTS

Description is made hereinafter for Embodiments 1 through 4 of the present invention.

Figure 1:
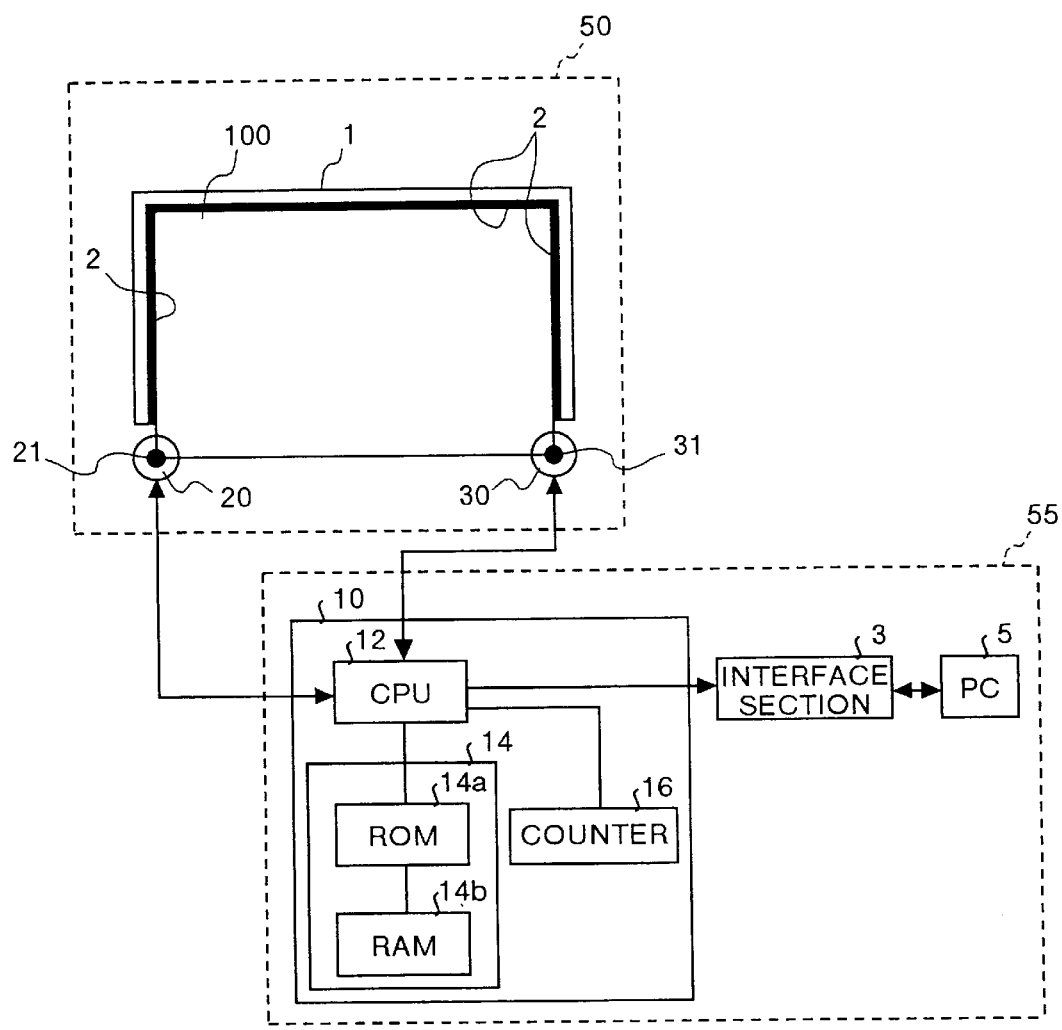
FIG. 1 is a block diagram for explaining the coordinates input device common between Embodiments 1 and 2 of the present invention.

FIG. 1 is a block diagram for explaining a coordinates input device according to the present invention, and is common between Embodiments 1 and 2. The configuration shown in the figure has an entry section 50 for entering characters or drawings freehand, and a control unit 10 for controlling processing or the like concerning detection of the characters or the like input into the entry section 50. In the embodiment of the present invention, a personal computer 5 (PC) is connected to the control unit 10 with the help of which an instruction of an operation can be entered. Thus, the control unit 10 and the PC 5 form a control section 55 in the embodiment of the present invention.

The entry section 50 comprises a panel 100 that defines an entry area, and optical units 20 and 30 for emitting light onto the surface of the panel are mounted on the panel 100. A frame 1 is provided on the three sides of the panel 100. A reflector 2 such as a reflecting tape for reflecting light emitted from the optical units 20 and 30 is attached to the inner peripheral surface of the frame 1 (the surface facing towards the panel). This reflector 2 reflects the light emitted from the optical units 20 and 30 along an optical axis which is identical to the optical axis along which the light came in.

Further, provided in the entry section 50 according to Embodiment 1 and Embodiment 2 are a sound-wave generator and a sound-wave detector for detecting sound waves generated by the sound-wave generator as entry-area measurement means. The sound-wave generator and the sound-wave detector will be explained later.

The control section 55 comprises a control unit 10, a PC and an interface section 3. The PC 5 is connected to the control unit 10 and functions also as the operation section for entering instructions to the control unit 10. The interface section 3 is used for outputting a signal from the control unit 10 to the PC 5 and vice versa. Furthermore, the control unit 10 comprises a CPU 12 and a storage section 14, and a counter 16. The counter 16 counts the time interval at prespecified time steps from the time when the sound waves are generated in the sound-wave generator until these waves are detected in the sound-wave detector.

The CPU 12 receives a signal output from each CCD line sensor 29 provided in the optical units 20 and 30 as well as a signal output from the sound-wave generator and sound-wave detector, and obtains a position of an obstacle such as a pen tip through computation according to the signals. The storing section 14 comprises a ROM 14a for storing therein data required for computation executed in the CPU 12, and a RAM 14b for successively storing therein each position of the obstacle calculated in the CPU 12.

Figure 2A:
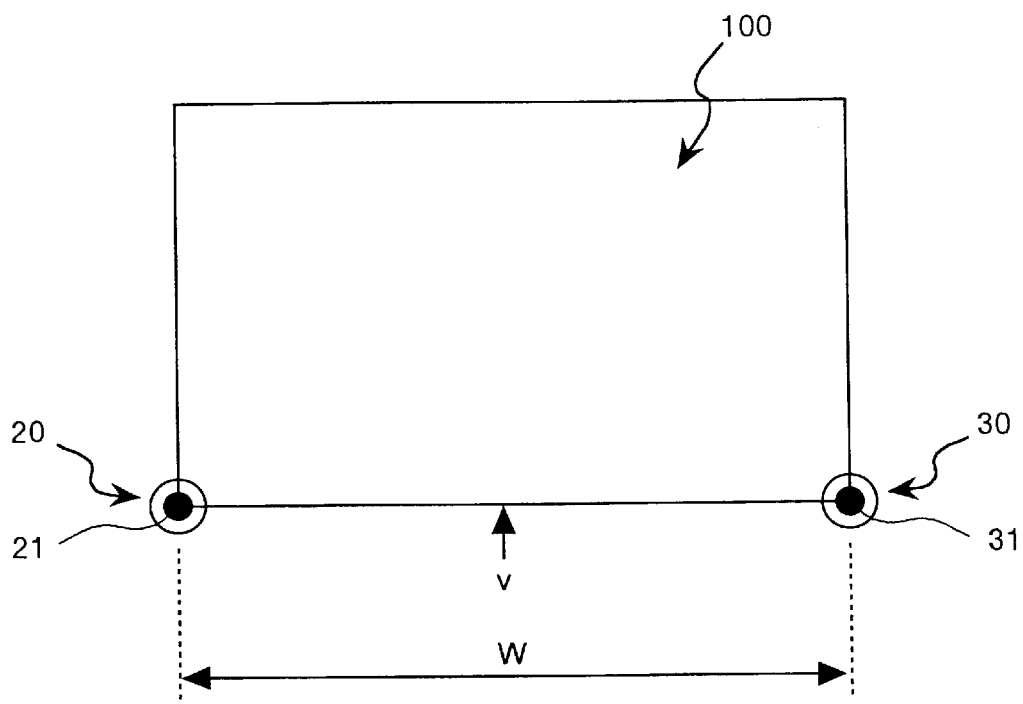
FIG. 2A is a view for explaining configuration of the entry section according to Embodiment 1 of the present invention and it is a top view of the device.
Figure 2B:
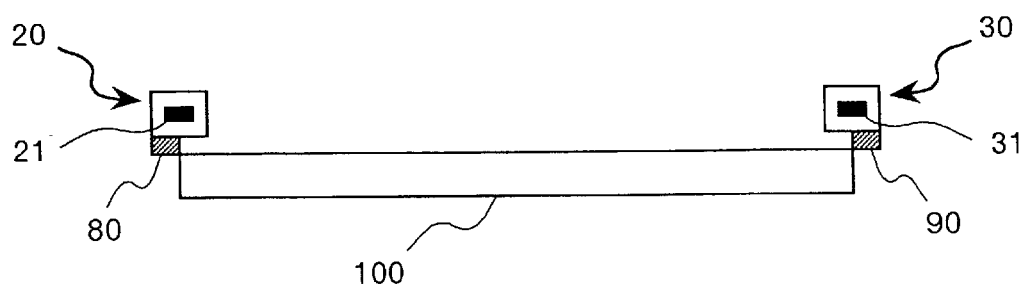
FIG. 2B is a side view when the device in FIG. 2A is viewed from the direction indicated by the arrow v.

FIG. 2A and FIG. 2B are views for explaining configuration of the entry section 50 of the coordinates input device configured as described above. The frame 1 and the reflector 2 are not shown in this figure for convenience in description. FIG. 2A is a top view of the entry section 50, and FIG. 2B is a side view when the device is viewed from the direction indicated by the arrow v. The entry section 50 in Embodiment 1 has an optical unit 20 with a substantially cylindrical appearance of at the lower left side of the panel 100 and an optical unit 30 with the same appearance as described above at the lower right side thereof in the figure. A light source 21 is provided in the optical unit 20 and a light source 31 is provided in the optical unit 30. The optical units 20 and 30 are utilized to measure the angles of emissions $\theta_R$ and $\theta_L$ of light passing blocked by the obstacle.

As shown in FIG. 2B, a sound-wave generator 80 is provided below the optical unit 20 and a sound-wave detector 90 for detecting sound waves generated by the sound-wave generator 80 is provided below the optical unit 30. The sound-wave generator 80 and sound-wave detector 90 are used for measuring a distance W between the light sources 21 and 31. Distance W can be measured accurately because a time until sound waves generated by the sound-wave generator 80 are detected in the sound-wave detector 90 is also measured. Consequently, a position where the sound waves are generated in the sound-wave generator 80 is accurately matched with the center of the light source 21. Further, a position where the sound waves are detected in the sound-wave detector 90 is accurately matched with the center of the light source 31. It is needless to say that a positional relation between the sound-wave generator 80 and the sound-wave detector 90 as described above may be reversed left to right in the configuration of FIG. 2B.

More specific explanation will be given below about the measurement of angles of emissions $\theta_R$, $\theta_L$ by the optical units 20 and 30 and measurement of distance W by the sound-wave generator 80 and sound-wave detector 90.

Figure 3A:
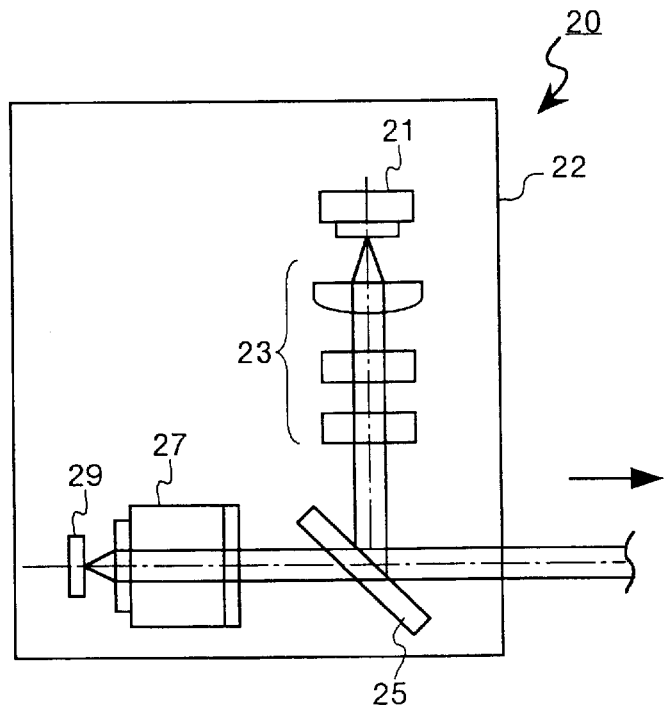
FIG. 3A is a view for explaining configuration of the optical unit in FIG. 1 and it is a side view of the unit.
Figure 3B:
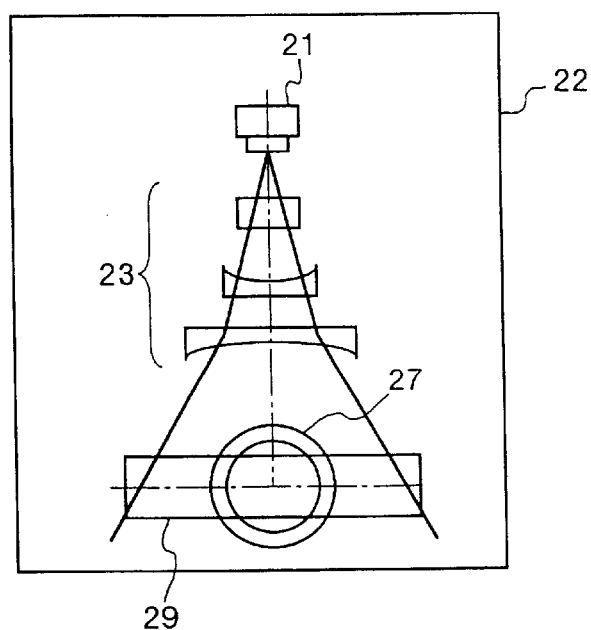
FIG. 3B is a front view (a face for emitting light) thereof.

The optical units 20 and 30 are configured as shown in, for instance, FIG. 3. FIG. 3A shows a side view of the optical unit, and FIG. 3B shows a front view (a face for emitting light) thereof. Since the optical units 20 and 30 are configured in the same manner, the optical unit 20 will only be explained using FIG. 3.

The optical unit 20 comprises a light source 21, a CCD line sensor 29 for sensing reflected light of the light emitted from the light source 21, a lens section 23/a lens section 27 for diffusing/converging the emitted/reflected light as required, and a half mirror 25 for reflecting the emitted light to the panel 100 and also passing therethrough the reflected light to the lens section 27.

The light beam output from the light source 21 is diffused in the lens section 23, reflected by the half mirror 25 to the panel 100, and emitted outside of a case 22. As a result, a light flux in a fan shape spread at an emission port (not shown herein) as a pivot provided in the case 22 is irradiated onto the panel 100. The light irradiated onto the panel 100 is reflected by the reflector 2 provided at the edges of the panel 100. The reflector 2 reflects all the light beams forming the fan-shaped light flux so that each of the beams is reflected along the same optical axis on its emission.

Therefore, all the light beams return into the case 22, are converged by passing through the half mirror 25, and are sensed by the CCD line sensor 29.

In the optical unit 20 configured as described above, if there is any obstacle on the panel 100, the light beam is blocked by this obstacle and can not be sensed in the CCD line sensor 29. If the element of the CCD line sensor 29 that does not receive any light can be determined, then the angle of emission $\theta_L$ of the original light beam can be obtained from the position of this element and the spread of the light flux. Similarly, angle of emission $\theta_R$ of the original light beam blocked by the obstacle of light beams emitted from the light source provided in the optical unit 30 can be calculated using the result of detection in the optical unit 30.

The sound-wave generator 80 starts the generation of the sound waves when the power of the coordinates input device is turned ON. The counter 16 starts counting, which counting is performed at prespecified time intervals, along with power ON. The counter 16 stops the counting when a signal indicating sound-wave detection is received from the sound-wave detector 90. The counts counted from generation of sound waves until detection thereof is input into the CPU 12. The CPU 12 computes a actual distance $W_m$ (m) between the light source 21 and light source 31 through the equation (3) described below using the count t (times) and the time cycle of counting s (second).

$$W_m = v \text{ (sound speed: 340 m/s)} \cdot t \cdot s \tag{3}$$

The CPU 12 reads the equations (1) and (2) stored in the ROM 14a or so, substitutes the actual distance $W_m$ in W, and corrects the equations (1) and (2) according to the actual distance between the light sources 21 and 31. When the angle of emissions $\theta_R$, $\theta_L$ measured respectively by the optical units 20 and 30 are received, the CPU 12 computes coordinates of the point P ($x_p$, $y_p$) where the obstacle exists by using the corrected equations (1) and (2).

The corrected equations (1) and (2) may be stored in the RAM 14b as required. In addition, the equations (1) and (2) stored in the RAM 14b may further be rewritten each time when the actual distance $W_m$ is updated.

With Embodiment 1 described above, it is possible to actually measure a distance between the light sources 21 and 31 used for detecting the coordinates of the obstacle and also determine this distance with high accuracy using the sound waves. Therefore, accurate coordinates of the obstacle can be calculated at any time regardless of whether the panel 100 was manufactured with accurate dimensions or whether the optical units were attached to the panel 100 with high accuracy.

A series of processes executed in the coordinates input device according to Embodiment 1 will be explained below with reference to a flow chart.

Figure 4:
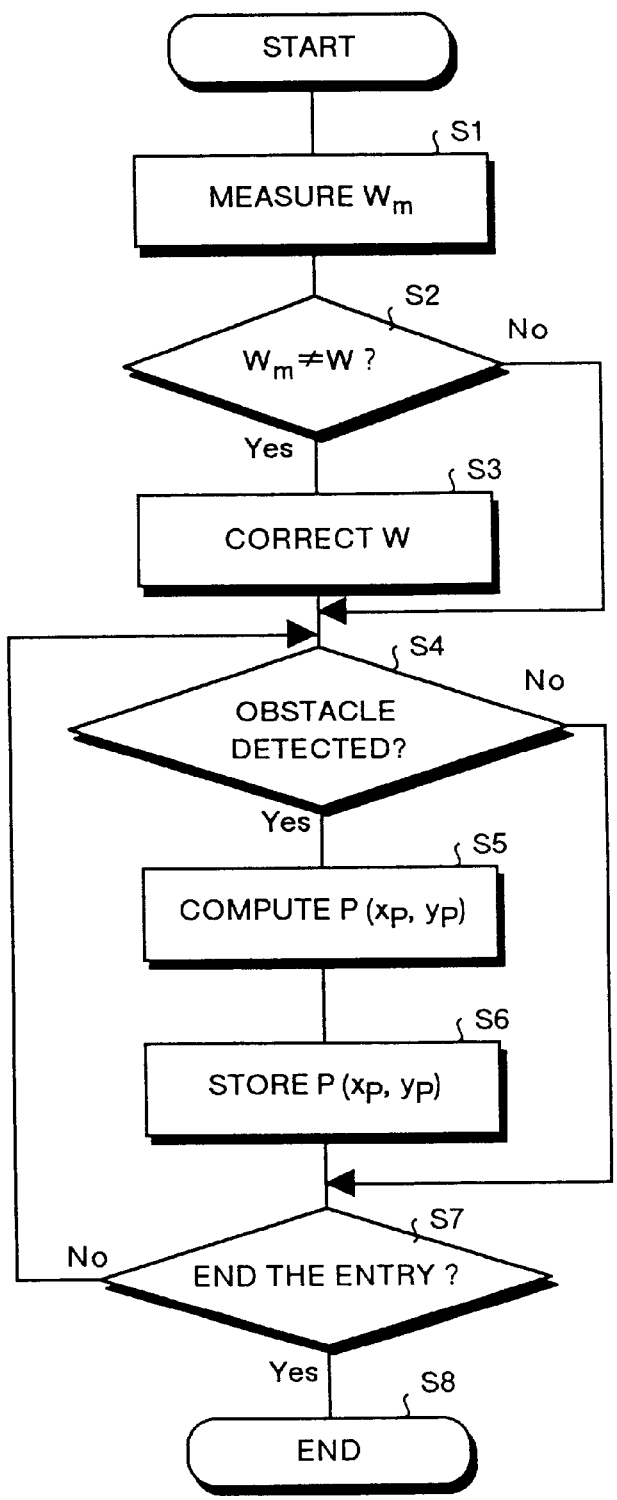
FIG. 4 is a flow chart for explaining the processes executed in Embodiment 1 of the present invention.

FIG. 4 explains the process executed by the coordinates input device according to Embodiment 1. When an instruction to start the process is input, for instance, from the PC 5, the sound-wave generator 80 located at the right corner of the panel 100 generates sound waves, and the actual distance $W_m$ is obtained by substituting a number of counts (namely time) until the sound wave is detected by the sound-wave detector 90 in the equation (3) (step S1).

It is then determined whether the actual distance $W_m$ and the distance W set in the equations (1) and (2) are same (step S2). If the actual distance $W_m$ and the distance W are different from each other (step S2: Yes), the CPU 12 reads out the equations (1) and (2) from the ROM 14a, and corrects the equations (1) and (2) by replacing the distance W in these equations with the actual distance $W_m$ (step S3). If the actual distance $W_m$ is equal to the distance W (step S2: No), the step of correcting the distance W in the equations (1) and (2) is omitted.

It is then determined whether an obstacle is detected or not (step S4). When the obstacle is detected (step S4: Yes), coordinates P ($x_p$, $y_p$) of the obstacle are calculated by using the computation equation on the CPU 12 (step S5), and the coordinates are stored in, for instance, the RAM 14b (step S6) It is then determined whether an instruction indicating end of entry to the coordinates input device has been issued from the PC 5 or not (step S7). If such an instruction is not received (step S7: No), the system control returns to the step for determining detection of the obstacle (step S4). When the instruction indicating the end of entry is received (step S7: Yes), the process in this flow chart is terminated. When an obstacle is not detected (step S4: No), it is continuously determined whether the instruction indicating end of entry has been received or not (step S7: No), and the process in this flow chart is terminated when the instruction is received.

It should be noted that the present invention is not limited to Embodiment 1 described above. For example, the optical unit is directly mounted on the panel in Embodiment 1, but the optical unit may be mounted thereon through a frame body. further, the CCD line sensor is used as a light detector in Embodiment 1, but the present invention is not limited to the configuration described above, and any sensor may thus be employed on condition that the sensor can determine angle of emission of the light blocked by the obstacle from the received reflected light.

In Embodiment 1 described above, the sound-wave generator 80 and sound-wave detector 90 are configured to be provided on the top surface of the panel 100, so that sound waves transmitted from the sound-wave generator 80 are spread out in all directions. However, the present invention is not limited to the case described above, for example, the present invention may be configured having a frame whose top surface is formed with the entry section 50 and panel 100, and the sound-wave generator 80 and sound-wave detector 90 may be provided inside the frame. A frame body may be provided in the lower side of the panel 100 so as to create clearance between the frame body and the panel 100, and sound waves may propagate through the air in the space generated due to the clearance.

In any of the cases described above, a space through which sound waves propagate is limited and propagation and reflection of sound waves are repeated between the light sources. Therefore sound waves generated in the sound-wave generator 80 are easily detected by the sound-wave detector 90.

Embodiment 2 of the present invention will be explained below.

Figure 5A:
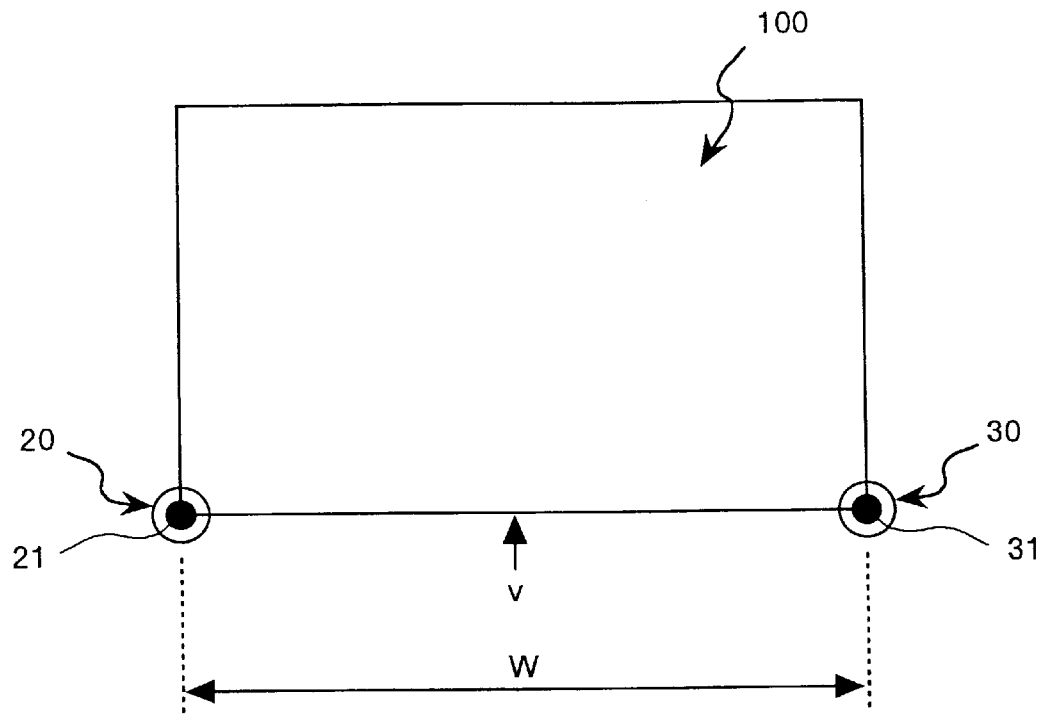
FIG. 5A is a view for explaining configuration of the entry section of the coordinates input device according to Embodiment 2 and it is a top view.
Figure 5B:
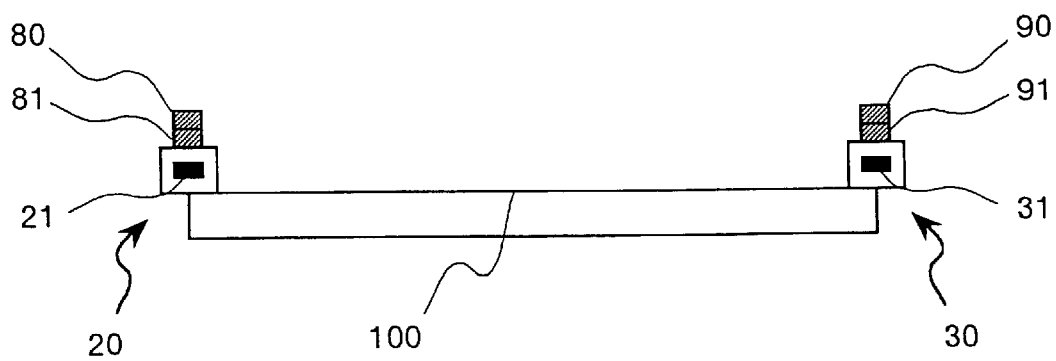
FIG. 5B is a side view when the entry section in FIG. 5A is viewed from the direction indicated by the arrow v.

FIG. 5A and FIG. 5B explain the configuration of an entry section of a coordinates input device according to Embodiment 2. The frame 1 and the reflector 2 are not shown in this figure for convenience in description. FIG. 5A is a top view of the entry section 50, and FIG. 5B is a side view when the device is viewed from the direction indicated by the arrow v. In FIG. 5A and FIG. 5B, the same reference numerals are assigned to components corresponding to those in FIG. 2A and FIG. 2B, and description thereof is partially omitted herein.

The entry section shown in FIG. 5A and FIG. 5B has the panel 100, optical units 20 and 30 each provided on the panel 100. The light sources 21 and 31 are provided in the optical units 20 and 30 respectively. As shown in FIG. 5B, in Embodiment 2, a sound-wave generator 91 and a sound-wave detector 81 are provided in addition to the sound-wave generator 80 and sound-wave detector 90 described in Embodiment 1. The position of the sound-wave generator 91 is adjusted at the center of the light source 31, and the position of the sound-wave detector 81 is adjusted at the center of the light source 21. It is only necessary that the sound-wave generator and a sound-wave detector are provided at the position of the light sources 21 and 31. It is needless to say that the positional relation between the sound-wave generator and the sound-wave detector may be reversed left to right in the configuration shown in FIG. 5B.

In Embodiment 2 configured as described above, the sound-wave generator 80 generates the sound waves and the sound waves are detected in the sound-wave detector 90. The time from the generation of the sound wave until detection of the sound wave is counted by the counter 16, and an actual distance $W_{1m}$, (first actual distance) is measured through first measurement of a actual distance according to the counted value. Subsequently, the sound-wave generator 91 generates the sound waves and the sound waves are detected in the sound-wave detector 81. An actual distance $W_{2m}$ (second actual distance) is measured through second measurement of a actual distance according to the counted time from generation of the sound wave until detection thereof.

In Embodiment 2 described above, for instance, when values measured twice in the measurement of a distance are different, it can be considered to employ an average value of the values as a actual distance and to use the average value for calculating the coordinates ($x_p$, $y_p$). With the device configured as described above, variations in actual distance due to variations in accuracy of sound-wave detection based on characteristics and locations of the sound-wave generator and sound-wave detector can be eliminated and more accurate actual distance can be calculated.

A series of processes executed in the coordinates input device according to Embodiment 2 will be explained below with reference to a flow chart.

Figure 6:
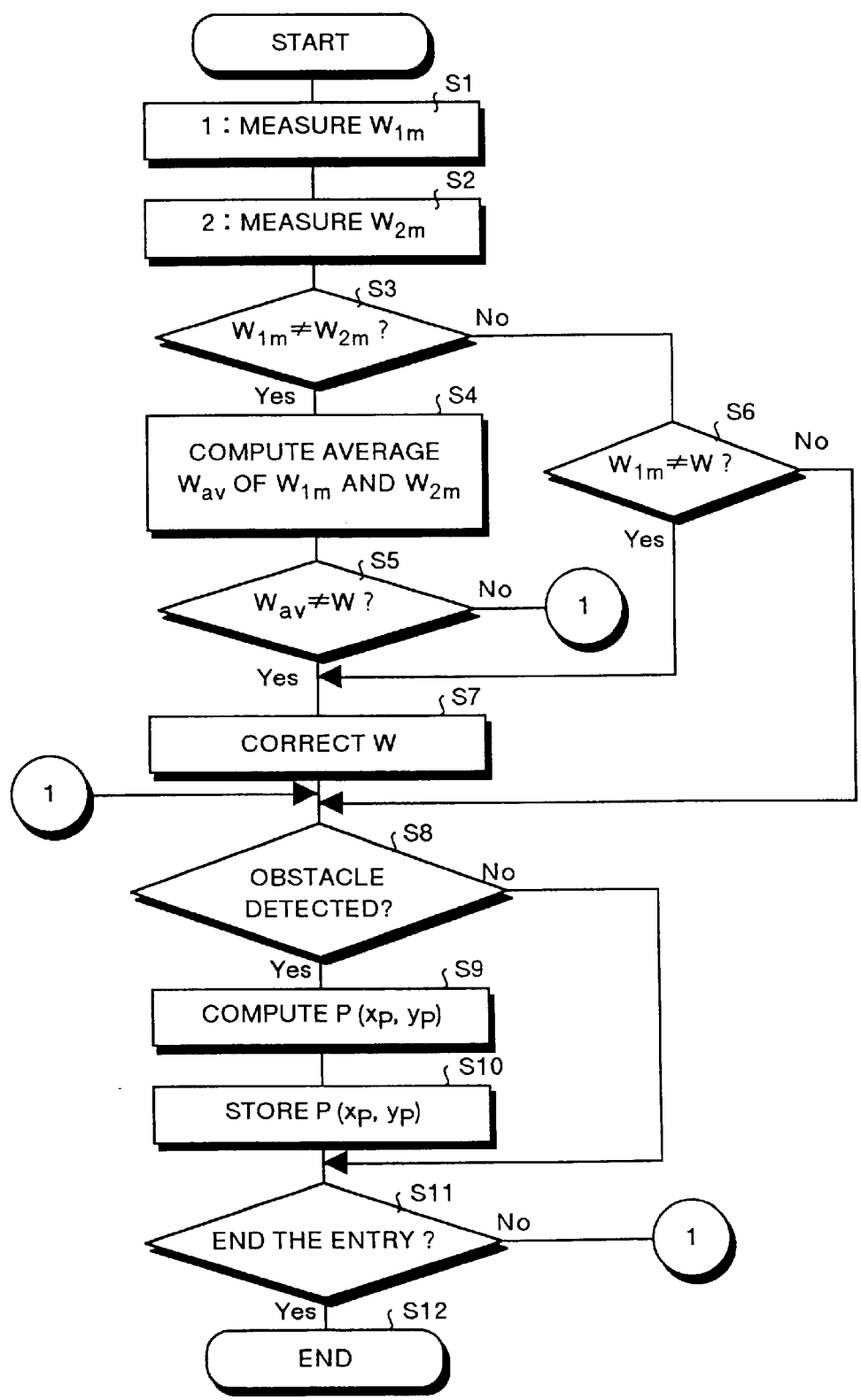
FIG. 6 is a flow chart for explaining the processes executed in Embodiment 2 of the present invention.

FIG. 6 explains the process executed by the coordinates input device according to Embodiment 2. When an instruction to start the process is input, for instance, from the PC 5, the sound-wave generator 80 located at the right corner of the panel 100 generates sound waves, and the actual distance $W_{1m}$ is obtained by substituting a number of counts (namely time) until the sound wave is detected by the sound-wave detector 90 in the equation (3) (step S1). Sound waves are then generated by the sound-wave generator 91 to similarly measure a second actual distance $W_{2m}$ (step S2).

It is then determined whether the first actual distance $W_{1m}$ and second actual distance $W_{2m}$ are equal to each other or not (step S3). If the first actual distance $W_{1m}$ and the second actual distance $W_{2m}$ are different from each other(step S3: Yes), an average $W_{av}$ of the two distances is calculated (step S4). It is then determined whether the average $W_{av}$ and the distance W set in the equations (1) and (2) are equal to each other or not (step S5). If the average $W_{av}$ and the distance W are different from each other (step S5: Yes), the CPU 12 reads out the equations (1) and (2) from the ROM 14a, and corrects the equations (1) and (2) by replacing the distance W in these equations with the average $W_{av}$ (step S7). If the average $W_{av}$ is equal to the distance W (step S5: No), the step of correcting the distance W in the equations (1) and (2) is omitted.

If it is determined in step S3 that the first actual distance $W_{1m}$ and second actual distance $W_2$ mare equal to each other (step S3: No), then in step S6 it is determined whether the first actual distance $W_{1m}$ and the distance W are equal to each other or not. If the first actual distance $W_{1m}$ and the distanced are different from each other (step S6: Yes) then the equations (1) and (2) are corrected so as to replace the distance W with the first actual distance $W_{1m}$ (step S7) On the other hand, if the first actual distance $W_{1m}$ and the distance W are equal to each other (step S6: No), the step of correcting the distance W is omitted.

It is then determined whether an obstacle is detected or not (step S8). When the obstacle is detected (step S8: Yes), coordinates $P(x_p, y_p)$ of the obstacle are calculated by using the computation equation on the CPU 12 (step S9), and the coordinates are stored in, for instance, the RAM 14b (step S10) It is then determined whether an instruction indicating end of entry to the coordinates input device has been issued from the PC 5 or not (step S11). If such an instruction is not received (step S11: No), the system control returns to the step for determining detection of the obstacle (step S8). When the instruction indicating the end of entry is received (step S11: Yes), the process in this flow chart is terminated. When an obstacle is not detected (step S8: No), it is continuously determined whether the instruction indicating end of entry has been received or not (step S11: No), and the process in this flow chart is terminated when the instruction is received.

Embodiment 3 of the present invention will be explained below.

FIG. 7 is a block diagram for explaining a coordinates input device according to Embodiment 3. The configuration shown in FIG. 7 is the substantially same as FIG. 1 describing the configuration of the coordinates input device according to Embodiments 1 and 2. Therefore, the same reference numerals are assigned to components corresponding to those in FIG. 1, and description thereof is partially omitted herein.

An entry section 51 shown in FIG. 7 has, in addition to the entry section 50 in FIG. 1, a sound-wave detector 110 at an edge opposite to the edge of the panel where the optical units 20 and 30 are provided, and a detection signal output from the sound-wave detector 110 is input into the control unit 10 of the control section 55. As described in FIG. 8A and FIG. 8B, one sound-wave generator is provided at the center of each of the light sources 21 and 31.

Figure 8A:
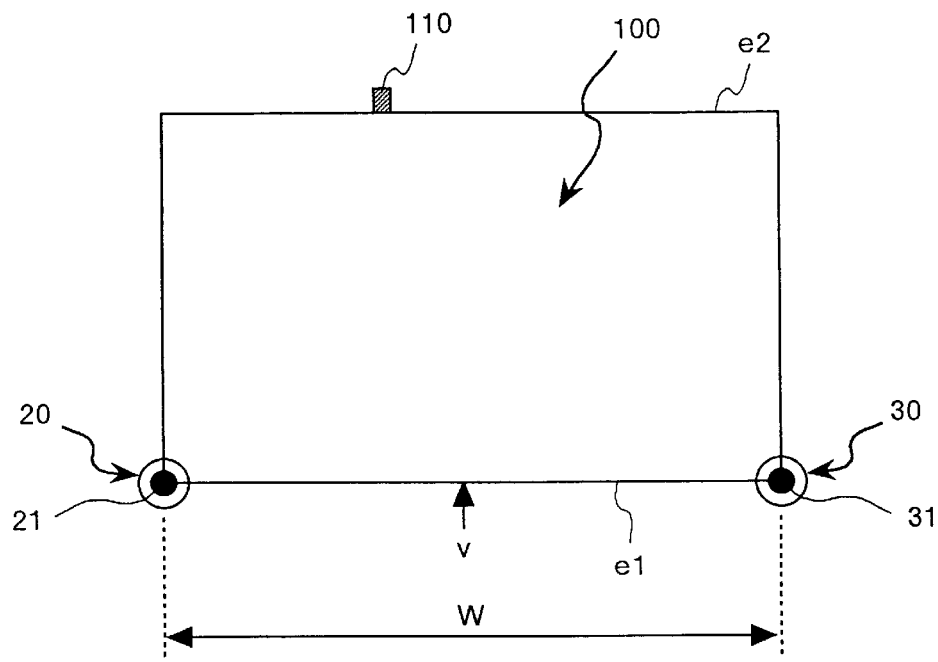
FIG. 8A is a view for explaining configuration of the entry section according to Embodiment 3 and it is a top view.
Figure 8B:
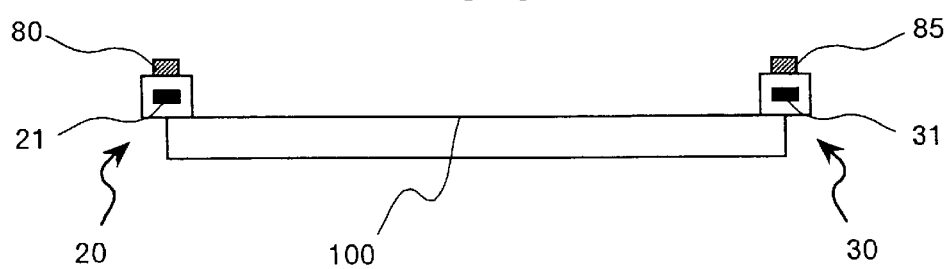
FIG. 8B is a side view when the entry section in FIG. 8A is viewed from the direction indicated by the arrow v.

FIG. 8A and FIG. 8B views for explaining configuration of the entry section 51 of the coordinates input device according to Embodiment 3. The frame 1 and the reflector 2 are not shown in this figure for convenience in description. FIG. 8A is a top view of the entry section 51, and FIG. 8B is a side view when the device is viewed from the direction indicated by the arrow v. In FIGS. 8A and FIG. 8B, the same reference numerals are also assigned to components corresponding to those in FIG. 2A and FIG. 2B, and description thereof is partially omitted herein.

The entry section 51 shown in FIG. 8A and FIG. 8B has the panel 100, an optical unit 20 having a light source 21 and an optical unit 30 having a light source 31. In Embodiment 3, as shown in FIG. 8A, the optical units 20 and 30 are so located that their centers are positioned on the edge e1 of the panel 100. A sound-wave generator 85 is provided in addition to the sound-wave generator 80. The position of the sound-wave generator 80 is adjusted at the center of the light source 21 and the position of the sound-wave generator 85 is adjusted at the center of the light source 31. On the other hand, as shown in FIG. 8A, the sound-wave detector 110 for detecting sound waves generated by the sound-wave generators 80 and 85 is provided on an edge e2 opposite to the edge e1.

Figure 9:
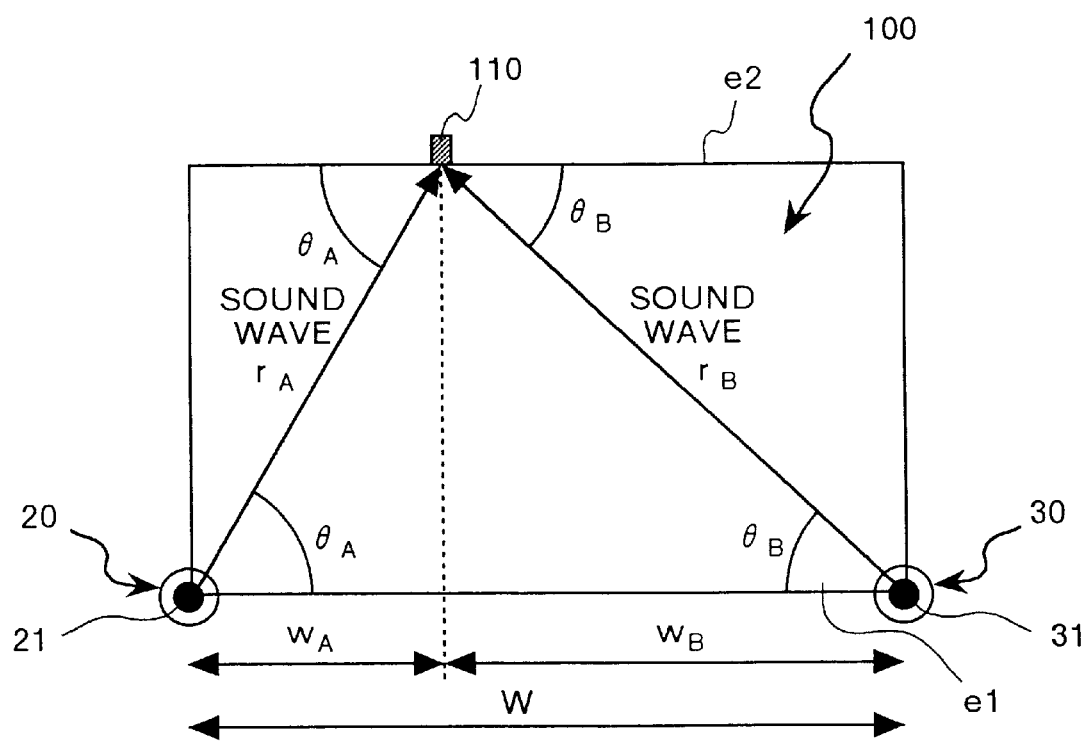
FIG. 9 is a view for explaining a method of measurement of the distance W with the configuration shown in FIG. 8A and FIG. 8B.

It should be noted that, in the configuration described above, it is not limited that the sound-wave detector 110 is provided at the location shown in FIG. 7 to FIG. 9. Further, sound-wave detectors may be provided at the positions of the two sound-wave generators 80 and 85 and a sound-wave generator may be provided at the position of the sound-wave detector 110.

FIG. 9 is a view for explaining a method of measuring a distance W by detecting sound waves generated from the sound-wave generators 80 and 85 shown in FIG. 8A and FIG. 5B by the sound-wave detector 110. In Embodiment 3, the angle $\theta_A$ between a line $r_A$ and the edge e1 or the edge e2 is previously calculated. Further, the angle $\theta_B$ between a line $r_b$ and the edge e1 or the edge e2 is previously calculated. The line $r_A$ is straight a line that links the sound-wave generator 80 and the sound-wave detector 110 and the line $r_B$ is straight a line that links the sound-wave generator 85 and the sound-wave detector 110.

The lengths of the lines $r_A$ and line $r_B$ are obtained in the following manner. The time since sound waves are transmitted from the sound-wave generator 80 and sound-wave generator 85 until the time the sound waves are detected by the sound-wave detector 110 is measured. Since the velocity of the sound waves is know, the lengths of the lines $r_A$ and line $r_B$ can be obtained from the measured time. The CPU 12 then calculates the distances $W_A$ and $W_B$ shown in this figure from the angles $\theta_A$ and $\theta_B$ the obtained lengths of the lines $r_A$ and $r_B$ based on the relation described below.

$$W_A = r_A \cdot \cos\theta_A \quad (4)$$

$$W_3 = r_b \cdot \cos\theta_B \quad (5)$$

Because $W = W_A + W_B$, the actual distance $W_m$ can be calculated by adding the distances $W_A$ and $W_B$ calculated using the equations (4) and (5). The distance $W_A + W_B$ obtained in this way may be previously stored in the ROM 14a as the distance to be used in the equations (1) and (2) is as a value of Wa+Wb. The coordinates $P(x_p, y_p)$ can be calculated by using a measured value which does not need any correction, which allows the processing required for computation to be made more simpler.

In Embodiment 3, the actual distance $W_m$ is measured at every prespecified time interval. Thus, changes in this distance due to expansion or shrinkage can be detected during entry of the coordinates. By operating as described above, even in the case where a panel is deformed because an environmental temperature changes during entry of coordinates, the change can be detected, and the coordinates $P(x_p, y_p)$ can be calculated by using the distance obtained after the change from that point of time.

In Embodiment 3 described above, variations in actual distances due to variations in accuracy of sound-wave detection based on characteristics and locations of the sound-wave generator and sound-wave detector can be eliminated. In addition, any error in measurement according to measured points of a panel can also eliminated, thus more accurate actual distance being calculated.

A series of processes executed in the coordinates input device according to Embodiment 3 will be explained below with reference to a flow chart.

Figure 10:
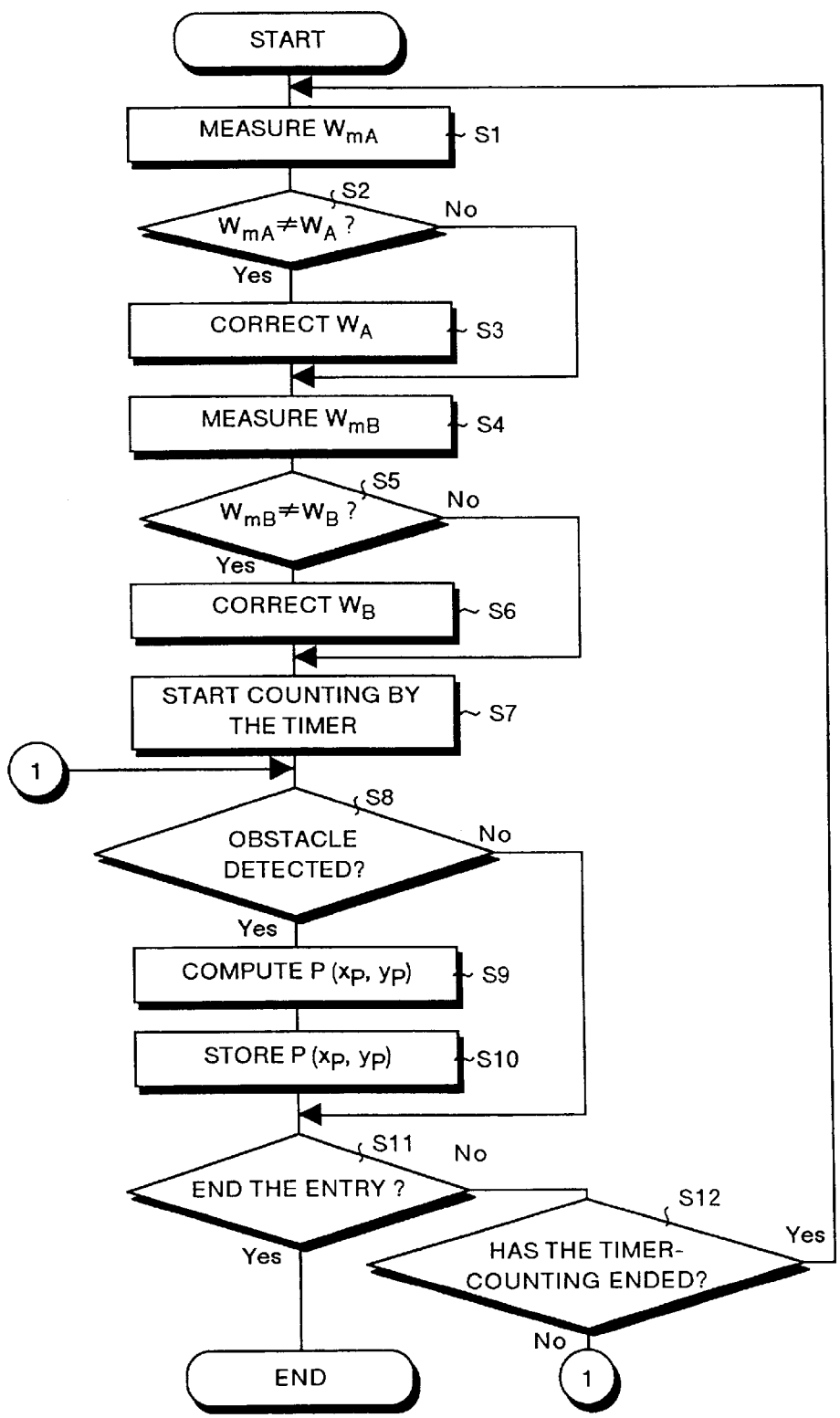
FIG. 10 is a flow chart for explaining the processes executed in Embodiment 3 of the present invention.

FIG. 10 explains the process executed by the coordinates input device according to Embodiment 2. When an instruction to start the processing is input, the control unit 10 generates a sound wave from, for instance, the sound-wave generator 80, and measures a actual distance $W_{mA}$ by substituting a number of counts (namely time) until the sound wave is detected by the sound-wave detector 110 in the equation (3) (step S1).

It is then determined whether the actual distance $W_{mA}$ is equal to distance $W_A$ stored in the ROM 14a or not (step S2).

When the actual distance $W_A$ and the distance $W_A$ are different from each other (step S2: Yes), the CPU 12 reads out the equations (1) and (2) stored in the ROM 14a and replaces the distance $W_A$ with the distance $W_{mA}$ (step S3). If the distance $W_A$ is equal to the distance $W_{mA}$ (step S2: No), the step of correcting the distance $W_A$ in the equations (1) and (2) is omitted.

The control unit then generates sound waves from the sound-wave generator 85 to similarly measure a actual distance $W_{mB}$ (S4). It is then determined whether the actual distance $W_{mB}$ is equal to $W_B$ or not (S5). If both the distances are different from each other (step S5: Yes), the CPU 12 reads out the equations (1) and (2), replaces the distance $W_B$ with the distance $W_{mB}$ (S6). If the distance $W_B$ is equal to the distance $W_{mB}$ (step S5: No), the step of correcting the distance WB in the equations (1) and (2) is omitted.

In Embodiment 3, hereafter counting further to count a time interval for measuring a actual distance $W_m$ is started by the timer 16 (step S7). After the start of counting, it is determined whether an obstacle is detected or not (step S8). If the obstacle is detected (step S8: Yes), the CPU 12 calculates coordinates $P(x_p, y_p)$ of the obstacle (step S9), and stores the coordinates in, for instance, the RAM 14b (step S10). It is then determined whether an instruction indicating end of entry to the coordinates input device has been received from the PC 5 or not (step S11). If it is determined that the entry is not ended (step S11: No), it is determined whether counting started in step S7 is finished or not (step S12).

As a result of the determination in step S12, when the counting is not finished (S12: No), system control returns to the step of determining detection of an obstacle again (step S8). When it is determined that the counting has been finished, the distance $W_{mA}$ is measured again (step S1). If it is determined in step S11 that the instruction indicating end of entry is received (step S11: Yes), the process in this flow chart is terminated. On the other hand, when it is determined in step S8 that an obstacle is not detected (step S8: No), it is continuously determined whether the instruction indicating end of entry is received or not (step S11), the process in this flow chart is terminated when the instruction is received.

It should be noted that the coordinates input device according to the present invention is not limited to Embodiments 1 to 3 described above. Namely, in the embodiments, the processing of repeating measurement of a actual distance $W_m$ at each prespecified time interval is programmed only in Embodiment 3, but it is also possible to be configured to repeat measurement of a actual distance $W_m$ in the other Embodiments 1 and 2. When the device is configured in this manner, panel distortion during entry of coordinates can be detected, and coordinates $P(x_p, y_p)$ can be calculated by using distances $W_A$, $W_B$ obtained after the change in Embodiment 1 and Embodiment 2 as well.

In any of Embodiments 1 to 3, a sound-wave generator and a sound-wave detector are used as an entry-area measurement means. However, for instance, a light generator and a light detector which detects the light generated by the light generator may be used as the entry-area measurement means, in which a actual distance $W_m$ may be measured by the light.

Embodiment 4 of the present invention will be explained below.

Embodiment 4 employs any of the coordinates input devices according to Embodiment 1 and Embodiment 2 described above as a coordinates input device for a display board system.

Figure 11:
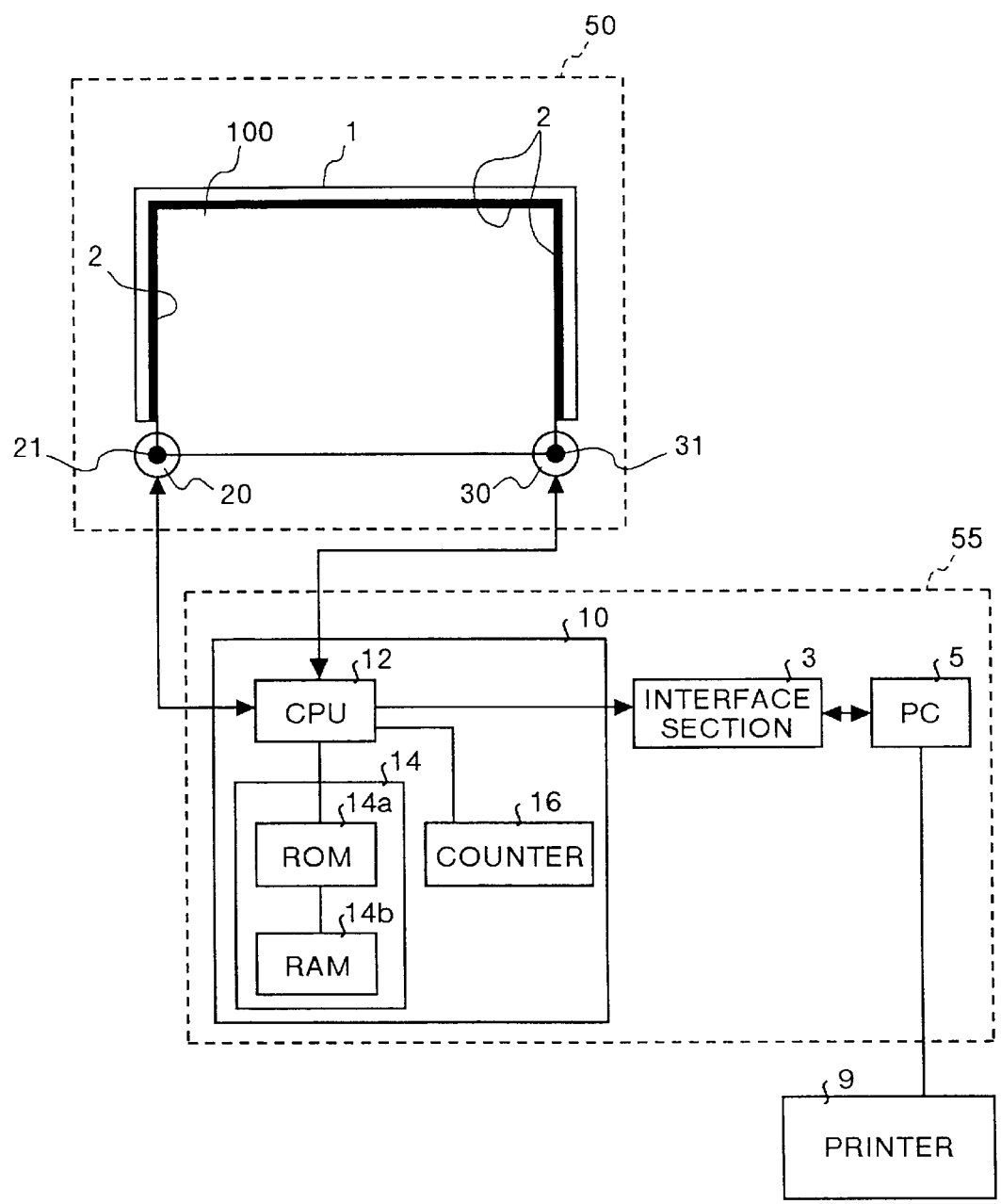
FIG. 11 is a block diagram for explaining the coordinates input device according to Embodiment 4 of the present invention.
Figure 12:
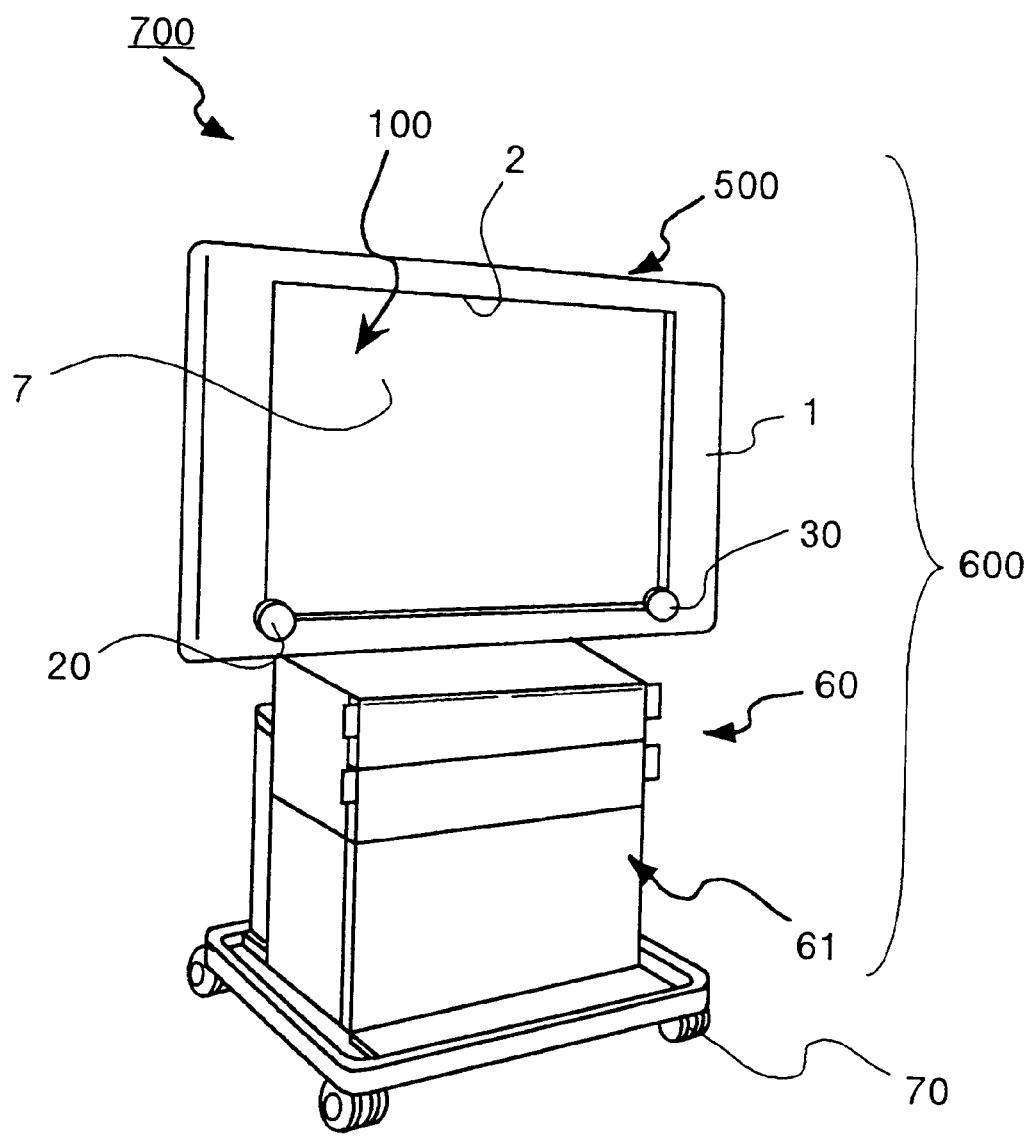
FIG. 12 is a perspective view showing the display board system according to Embodiment 4 and the housing unit with the display board system accommodated therein.
Figure 13:
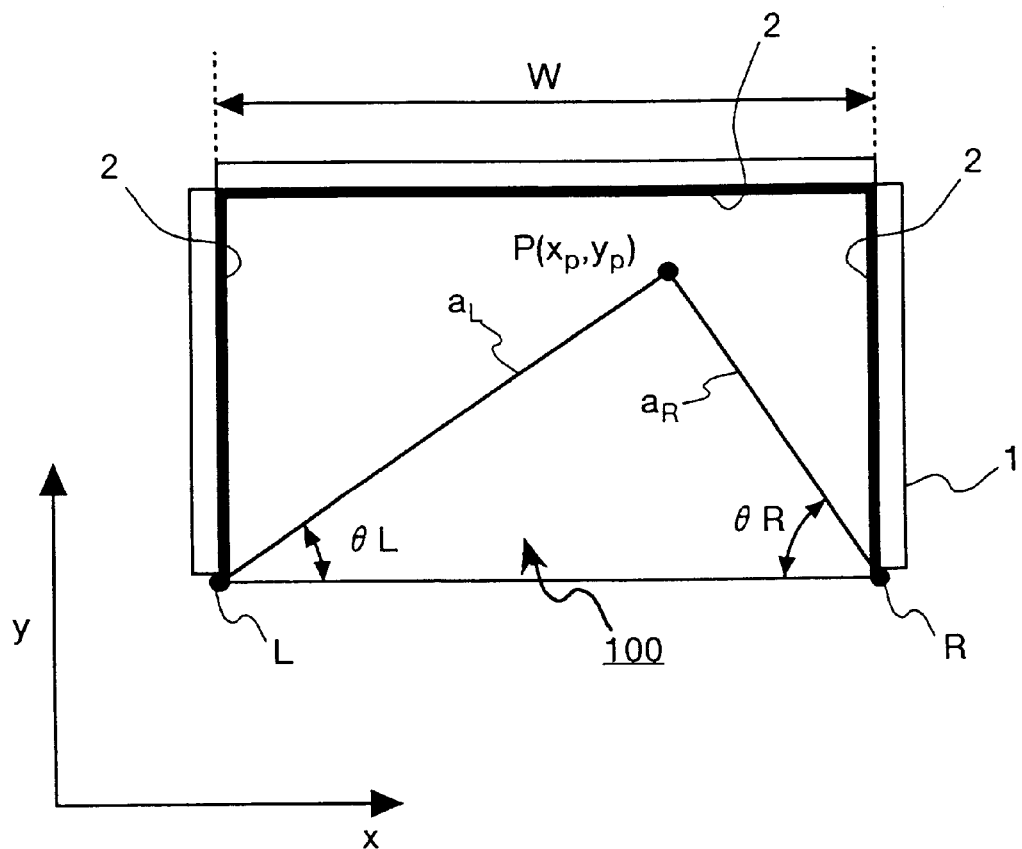
FIG. 13 is a view which explains how an obstacle is detected by the coordinates input device that spreads light emitted from a light source in a fan shape.

FIG. 11 and FIG. 12 explain a coordinates input device according to Embodiment 4. The configuration shown in FIG. 11 is the substantially same as that of FIG. 1, therefore, the same reference numerals are assigned to components corresponding to those in FIG. 1, and description thereof is omitted herein. The configuration in FIG. 11 is largely divided into an entry section 50 for inputting characters or a drawing freehand and a control section 55 for controlling detection or recording of the characters or so input in the entry section 50. The entry section 50 has a white board 7 in the rear side of the panel 100 shown in FIG. 1. Further, a printer 9 is connected to the control section 55. This printer is utilized to print out the contents displayed on the white board 7 onto a paper.

FIG. 12 is a perspective view showing a display board system 700 according to Embodiment 4. This display board system 700 comprises a housing unit 600 that accommodates a panel section 500 with the entry section 50 incorporated therein, a controller accommodating section 60 for accommodating the control unit 10 therein, an equipment accommodating section 61 for accommodating the PC 5 and the printer 9 therein, and further a caster section 70 for loading thereon the housing unit 600 as a whole to make the unit carriable.

The frame 1 having the reflector 2, the optical units 20 and 30 are integrated into one unit so as to be positioned on the front side of the white board 7, and accommodated in the panel section 500. When a user writes a character or so on the white board with a pen, coordinates of this pen tip are successively read in association with movement of the pen tip. The control unit 10 accumulates the read-in coordinates in the RAM 14b in the form of locus of the pen tip, namely as a form of the written-in character, in other words, as the contents written on the board.

The contents recorded as described above is sent to the printer 9 through the PC 5 so that the contents can be printed out onto a paper and given to the people hearing the presentation on this display board system. Therefore, the people hearing the presentation need not copy the contents written on the white board into a note or the like, so that they can concentrate more on what is being presented. The contents sent to the PC 5 can also be stored on an external memory such as a floppy disk herein. Therefore, the contents can arbitrarily be edited afterward.

In Embodiment 4 described above, the display board system is configured with the coordinates input device described in Embodiments 1 to 3, so that it is possible to detect the locus of a pen tip with high accuracy and accurately read the contents thereon. Thus, it is possible to provide a display board system enabling accurate reproduction of contents in the presentation afterward.

In Embodiment 4 described above, the display board system is configured with the coordinates input device described in Embodiments 1 to 3, so that it is possible to accurately measure a distance W between the optical units 20 and 30, and further correct equations for calculating positions of a pen tip according to the calculated actual distance $W_m$. Therefore, even if an actual distance W is different from a designed value because of variations in dimensions of the panel 100 or in locations of attaching the optical units 20 and 30 thereto, coordinates of the pen tip can be detected by using the actual distance W.

Further, the actual distance $W_m$ is repeatedly measured. Therefore, even if the distance W between the optical units 20 and 30 changes during entry of coordinates due to distortion of the panel 100 caused by changes in temperature or to loose screws or the like, this change is the dimensions does not affect the identification of the pen position.

As described above, Embodiment 4 can provide a high-reliability display board system.

It should be noted that the present invention is not limited to Embodiment 4 described above. For instance, as a display section, a display board or a plasma display or the like may be used other than the white board.

The above-described present invention has the effects described below.

According to one aspect of this invention, the dimensions of an entry area of the coordinates input device can be obtained at any time by measuring and calculating dimensions of the entry area required for calculating coordinates. Thus, accurate dimensions of the entry area can be obtained without improving accuracy of attaching the optical units thereto or accuracy of dimensions of an entry area. Therefore, it is possible to provide a coordinates input device which can accurately detect the position of an obstacle which is calculated based on the dimensions of the entry area.

Further, reliability of measured dimensions of the entry area can be enhanced by measuring dimensions of the entry area according to a propagation speed of waves. Therefore, it is possible to enhance the reliability of the position of an obstacle which is calculated based on the dimensions of the entry area.

Further, the reliability of measured dimensions of an entry area can be enhanced by enabling accurate detection of waves transmitted from the center of the first light source at the center of the second light source.

Further, dimensions of an entry area can be measured at an arbitrary position thereon by transmitting and detecting waves between the center of the first light source as well as the center of the second light source and any position of the entry area. Thus, any error which may occur in measurement depending on a measured position can be eliminated. Therefore, reliability of a calculated position of the obstacle can be enhanced further.

Further, the configuration of a coordinates input device can be simplified and make it more convenient for use by making a wave generator and a wave detector easily applied to the coordinates input device. In addition, increase of manufacturing cost due to installation of the wave generator and wave detector can be suppressed. Furthermore, by preventing erroneous detection of a wave due to light from the wave detector as well as to electromagnetic waves, the coordinates input device can be used in an environment which is affected by disturbances due to light and electromagnetic waves.

Further, the configuration of a coordinates input device can be simplified and make it more convenient for use by making a wave generator and a wave detector easily applied to the coordinates input device. In addition, increase of manufacturing cost due to installation of the wave generator and wave detector can be suppressed. Furthermore, the coordinates input device can be used in an environment where there is noise.

Further, an accurate position of an obstacle can be detected at any time regardless of deformation of a member to define an entry area by detecting changes in its dimensions over time by an entry-area measurement unit.

Further, a series of coordinates of a obstacle can be calculated by using operation equations corrected according to dimensions of an entry area obtained by actual measurement thereof. Therefore, it is possible to provide a coordinates input device which can automatically detects the accurate position of the obstacle without requiring an improvement in the accuracy of attachment of the optical units or without requiring an improvement in accuracy of dimensions of an entry area during manufacture.

Further, erroneous detection of a sound wave by a sound-wave detector can be prevented and reliability of dimensions of a measured entry area can further be enhanced by making the sound wave generated from a sound-wave generator easily detected by the sound-wave detector.

The display board system according to another aspect of this invention can compute a position of an obstacle according to accurate dimensions of an entry area by applying the coordinates input device described above to the display board system. Therefore, it is possible to provide a display board system enabling detection with high accuracy of contents written therein.

In addition, the invention described above can configure a display board system which can repeatedly measure an entry area and accurately read the written contents according to the measured values. Therefore, it is possible to provide a high-reliability display board system.

The present document incorporated by reference the entire contents of Japanese priority document, 11-22381 filed in Japan on Jan. 29, 1999.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A coordinates input device, comprising:
   a light emitter configured to emit a light flux to an entry area;
   a light receiver configured to receive the light flux emitted from said light emitter;
   a measurement unit configured to measure a distance between said light emitter and said light receiver; and
   a coordinate calculator configured to calculate coordinates of an obstacle in the light flux on the entry area based on the light flux received by said light receiver and the distance measured by said measurement unit.

2. A coordinates input device according to claim 1, wherein said measurement unit comprises:
   a wave generator configured to generate waves that propagate through the air; and
   a wave detector configured to detect the waves generated said wave generator, and to measure the distance by means of the waves.

3. A coordinates input device according to claim 2, wherein said light emitter comprises:
   a first light source; and
   a second light source; and
   wherein a first of said wave generator and said wave detector is provided at a center of said first light source, and a second of said wave generator and said wave detector is provided at a center of said second light source.

4. A coordinates input device according to claim 2, wherein said light emitter comprises:
   a first light source; and
   a second light source; and
   wherein a first of said wave generator and said wave detector is provided at a center of said first light source and said second light source, and a second of said wave generator and said wave detector is provided at any position on the entry area.

5. A coordinates input device according to claim 2, wherein said wave generator of said measurement unit is a sound-wave generator and said wave detector is a sound-wave detector configured to detect sound waves generated by said sound-wave generator, and wherein said measurement unit measures the distance using the sound waves.

6. A coordinates input device according to claim 2, wherein said wave generator of said measurement unit is a light generator and said wave detector is a light detector configured to detect light generated by said light generator, and wherein said measurement unit measures the distance using the light.

7. A coordinates input device according to claim 1, wherein said measurement unit repeatedly measures the distance at prespecified time intervals.

8. A coordinates input device according to claim 1, wherein said coordinate calculator corrects an equation used for calculating the coordinates of the obstacle based on the distance measured by said measurement unit.

9. A coordinates input device according to claim 5, wherein the entry area is surrounded by a frame, and said sound-wave generator and said sound-wave detector are installed inside said frame.

10. A coordinates input device comprising:
light emission means for emitting a light flux onto an entry area;
light reception means for receiving the light flux emitted from said light emission means;
measurement means for measuring a distance between said light emission means and said light reception means; and
coordinate calculation means for calculating coordinates of an obstacle in the light flux on the entry area based on the light flux received by said light reception means and the distance measured by said measurement means.

11. A coordinate input method comprising:
a light emission step of emitting a light flux onto an entry area;
a light reception step of receiving the light flux emitted in the light emission step;
a measurement step of measuring a distance between a light emitter and a light receiver; and
a coordinate calculation step of calculating coordinates of an obstacle in the light flux on the entry area based on the light flux received in said light reception step and the distance measured in said measurement step.

12. A display board system comprising:
a display unit configured to display characters and images thereon; and
a coordinates input device configured to be provided on a front surface of said display unit, said coordinates input device comprising:
a light emitter configured to emit a light flux to an entry area;
a light receiver configured to receive the light flux emitted from said light emitter;
a measurement unit configured to measure a distance between said light emitter and said light receiver; and
a coordinate calculator configured to calculate coordinates of an obstacle in the light flux on the entry area based on the light flux received by said light receiver and the distance measured by said measurement unit.

13. A display board system comprising:
display means for displaying characters and images thereon; and
coordinates input means provided on a front surface of said display means, said coordinates input means comprising:
light emission means for emitting a light flux onto an entry area;
light reception means for receiving the light flux emitted from said light emission means;
measurement means for measuring a distance between said light emission means and said light reception means; and
coordinate calculation means for calculating coordinates of an obstacle in the light flux on the entry area based on the light flux received by said light reception means and the distance measured by said measurement means.

* * * * *